Sept. 1, 1964  R. McVAY  3,146,543
FISHING LURE
Filed May 7, 1962
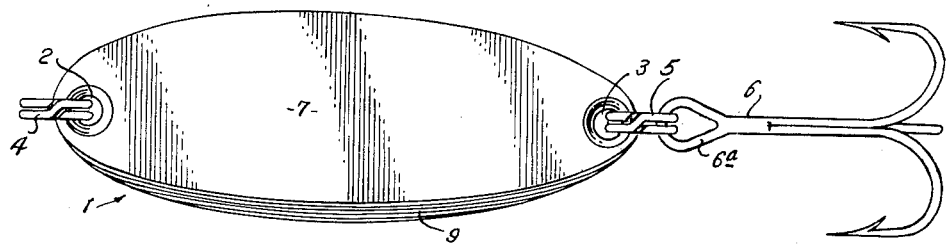
Fig. I
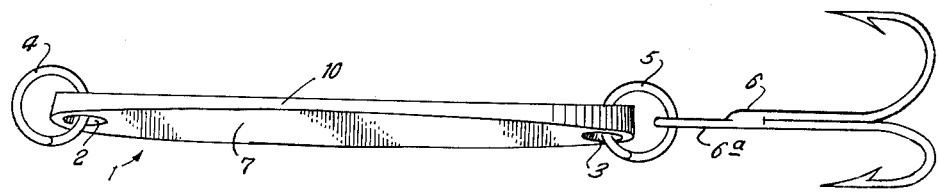
Fig. II
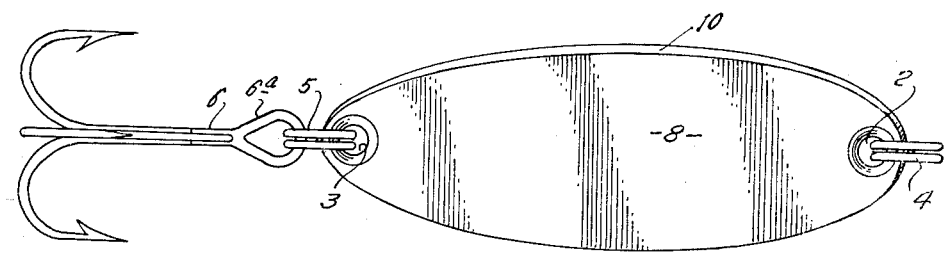
Fig. III
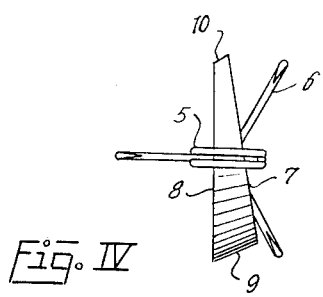
Fig. IV
INVENTOR.
Raymon McVay
BY Howard E. Moore
ATTORNEY

United States Patent Office 3,146,543
Patented Sept. 1, 1964

3,146,543
FISHING LURE
Raymon McVay, 717 W. Morgan, Denison, Tex.
Filed May 7, 1962, Ser. No. 192,891
1 Claim. (Cl. 43—42.45)

This invention is concerned with an artificial fishing lure, and is particularly concerned with that type of lure designed to attract the attention of fish by reflection of light from the surfaces thereof, and which has angularly disposed surfaces thereon arranged to act against the resistance of the water, as the lure is drawn or falls therethrough, to cause the lure to have an irregular wobbly or flippy motion to cause the reflective faces thereof to be more likely to cause reflection of light into the fishes' eyes in the vicinity to attract their attention.

A primary object of the invention is to provide a fishing lure of such shape and configuration as to give same an erratic wobbly and flippy motion in the water when it is pulled therethrough, or when it is allowed to fall through the water by gravity.

Still another object of the invention is to provide in a fishing lure of the reflective type, a body having four flat surfaces thereon, with angularly disposed surfaces so arranged that the resistance of the water acting against the angularly disposed surfaces, will cause the lure to have an irregular and wobbly movement through the water while being pulled therethrough or falling therein.

Another object of the invention is to provide a reflective type of fishing lure having beveled intersecting angularly disposed surfaces which are arranged to act against the water at different angular directions, to cause the fishing lure to have an erratic, wobbly, and side-to-side action in the water by action of the resistance of the water against such angled surfaces.

Still another object of the invention is to provide a fishing lure having a body with a tapered flat face thereon, which makes the lure wider at one side than at the other side, to cause same to be heavier at one side so that when no force is exerted thereagainst, the heavier bottom side will cause the lure to assume a generally horizontal position with the narrow side up, but having tapered edges thereon, which act against the water, to cause the lure to have a wobbly action when falling through the water in such horizontal position.

A still further object of the invention is to provide in a fishing lure a tapered face and an opposite longer flat face, providing angularly disposed parallel sides, with one side wider than the other, wherein the cross-sectional shape of the body is comprised of a trapezoid having two parallel edges, so that when the lure is pulled through the water the resistance of the water will tend to cause it to lie on its face, but the angular side surfaces and the angular edge surface will cause the lure to wobble on its horizontal axis, and move from side to side in an erratic motion, to attract the attention of fish in the vicinity.

A suitable embodiment of the invention is shown in the attached drawing wherein:

FIGURE I is a side elevational view of the fishing lure made in accordance with the invention;

FIGURE II is an edge view taken from the top side of FIGURE I;

FIGURE III is a side elevational view taken from the opposite side of FIGURE I; and FIGURE IV is a front end view of the lure taken from the left side of FIGURE I.

Numeral references are employed to indicate the various parts shown in the drawing, and like numerals indicate like parts throughout the various figures of the drawing.

The numeral 1 generally indicates a body which is preferably made of metal, and is finished with a smooth reflecting surface such as chrome plating, so that the respective surfaces thereof will, in effect, act as mirrors to reflect light therefrom to attract the attention of fish in the vicinity of the lure as it is moved through the water, or falls in the water, in a wobbly, erratic motion as hereinafter described.

The body 1 is provided with attachment eyes 2 and 3 at the front and rear ends thereof, respectively.

An attachment ring 4 is secured in the eye 2, the said ring 4 being arranged to receive a snap on the end of a fishing line (not shown), or the fishing line may be otherwise attached thereto.

A hook attaching ring 5 is secured in the eye 3, and a conventional hook 6 is pivotally attached to the ring 5, by engaging the eye 6a of hook 6 with the ring 5.

The body 1 is generally elliptical in shape when viewed from the side, and is provided with opposed flat faces of elliptical shape 7 and 8 of equal length. The face 7 is tapered angularly with respect to face 8, and is not as wide as face 8 between faces 9 and 10, so as to provide angularly disposed continuous top and bottom sides 9 and 10 joining the faces 7 and 8, and an opposite narrower side 10, which is also angularly disposed with reference to the faces 7 and 8. As shown, the side 10 is parallel with the side 9 and the body has a transverse axis which is parallel to the sides 9 and 10.

It will be seen from the foregoing that the body 1 so formed provides a body which is generally elliptical in shape when viewed from the side, but which when viewed from the end or in cross-section, has the cross-sectional shape of a relatively narrow trapezoid. The body is relatively thin with relation to the length and width thereof, but has one side which is thicker than the other side, and tapers from the wider side to the narrow side, so that the lure has a tendency to fall by gravity with the narrow side up.

It will be further observed that the side 10, as seen in FIGURE II, tapers from a narrow section at the center outwardly toward the ends so that said side is wider at the ends than at the center.

The action of the lure is as follows:

It is cast in the usual manner attached to the end of a fishing line. When it strikes the water, it can be allowed, if desired, to sink toward the bottom by slackening the line. As soon as the lure starts downward in the water, it assumes a generally horizontal position, with the wide side 9 directed downwardly, since such side is heavier than the side 10. The resistance of the water on the tapered surface 9 and the tapered surface 7 will cause the lure to move downwardly relatively slow, with a relatively quick flippy, wobbling action until it reaches the bottom.

If the line is tightened on the lure and retrieval is begun, the lure body will have a tendency to turn on its face with the face 7 upward. However, due to the action of the angled surfaces 7, 9 and 10, the lure will wobble about its horizontal axis in relatively quick motions, and will dart from side to side, the amount of movement depending upon the rate of retrieval. As soon as the fishing line is slackened, the lure will again start downward in a horizontal position with a wobbling, erratic movement, with the wide side 9 directed downwardly.

The tapers 9 and 10 on the opposite sides of the lure, being turned in opposite angular direction, will have a tendency to cause the lure to move in opposite directions and to spin about its axis. However, the larger area flat faces 7 and 8, and the angled face 7 will resist rotation about the horizontal axis, causing the lure to have a wobby side-to-side action. The lure can be caused to flip or rotate about its axis by increased retrieval speed. The wobbly flipping action of the lure causes the reflective faces 7, 8 and 9 to flash reflected light into the fish's eyes attract his attention.

The tapers and contours of the lure, including the tapered faces 7, 9 and 10, will cause the lure to start into action in any position, but the lure has sufficient balance, body weight, and resistance angles thereon to allow the use of hooks without affecting the action of the lure.

The lure has a continuous action, either when sinking or when being retrieved, so that the angled faces and sides thereof are continuously throwing off reflections in all directions to attract fish nearby.

The lure herein described permits a jigging action, causing the lure to move from side-to-side, and can be used with spinning or casting reels, for trolling or for jigging, and the action will be of the type herein described.

The lure actually has four reflecting faces, which are in constant movement when the lure is used, and will naturally attract more fish than a lure which only has one or two reflecting faces which are not in continuous motion.

Although it is desirable that the lure be made of reflecting material, such as chrome, nickel, silver or gold, it will be understood that it would be an effective lure even though it is painted of some color which is not necessarily reflective. The innate action of the lure body, as hereinbefore described, gives the lure an appeal to more effectively attract the attention of fish.

Having described my invention, I claim:

A fishing lure for use with a line and hook means, the lure comprising a substantially flat, elongated body having a pair of oppositely disposed substantially elliptical faces and having opposite longitudinal ends, said faces being connected by a continuous side wall including opposite portions comprising an upper edge and a lower edge encircling the entire lure, said faces being oriented at a slight angle to each other out of parallelism, the portions of the side wall along the upper and lower edge of the lure being inclined with respect to the faces so that, in a section taken transverse of the lure at the center thereof the said portions are approximately parallel, with the thickness of the lure in this section being greatest at the lower edge of the lure and the thickness of the side wall at each longitudinal end of the lure being substantially the same, said body being provided with two through apertures located, respectively, at each of the longitudinal ends of the lure approximately perpendicular to the plane of the lure body, one serving as the means for attachment of the line and the other as the means for attachment of the hook means.

References Cited in the file of this patent

UNITED STATES PATENTS

| | | |
|---|---|---|
| 1,455,624 | Koch | May 15, 1923 |
| 2,483,245 | Steinhart | Sept. 27, 1949 |
| 2,494,093 | Hill | June 10, 1950 |
| 2,938,293 | Richardson | May 31, 1960 |

FOREIGN PATENTS

| | | |
|---|---|---|
| 1,098,101 | France | Mar. 2, 1955 |
| 1,126,639 | France | July 30, 1956 |
| 673,008 | Great Britain | May 28, 1952 |